(12) United States Patent
Channabasappa

(10) Patent No.: US 9,178,692 B1
(45) Date of Patent: Nov. 3, 2015

(54) SERIAL LINK TRAINING METHOD AND APPARATUS WITH DETERMINISTIC LATENCY

(75) Inventor: Shankar Channabasappa, San Jose, CA (US)

(73) Assignee: BROADCOM CORPORATION, Irvine, CA (US)

( * ) Notice: Subject to any disclaimer, the term of this patent is extended or adjusted under 35 U.S.C. 154(b) by 780 days.

(21) Appl. No.: 13/034,441

(22) Filed: Feb. 24, 2011

(51) Int. Cl.
*H04L 12/28* (2006.01)
*H04L 7/04* (2006.01)
*H04L 7/00* (2006.01)

(52) U.S. Cl.
CPC .............. *H04L 7/041* (2013.01); *H04L 7/0083* (2013.01)

(58) Field of Classification Search
CPC ....... H04L 7/041; H04L 7/0083; H04J 3/0685
See application file for complete search history.

(56) References Cited

U.S. PATENT DOCUMENTS

| 5,841,766 | A * | 11/1998 | Dent et al. | 370/321 |
| 8,340,005 | B1 * | 12/2012 | Belhadj et al. | 370/300 |
| 8,413,006 | B1 * | 4/2013 | Mok et al. | 714/752 |
| 2002/0075845 | A1 * | 6/2002 | Mullaney et al. | 370/351 |
| 2008/0016269 | A1 * | 1/2008 | Chow et al. | 711/103 |
| 2010/0103952 | A1 * | 4/2010 | Bae et al. | 370/470 |
| 2012/0221882 | A1 * | 8/2012 | Morrison et al. | 713/500 |

* cited by examiner

*Primary Examiner* — Ajay Cattungal
(74) *Attorney, Agent, or Firm* — Sterne, Kessler, Goldstein & Fox P.L.L.C.

(57) ABSTRACT

A method is disclosed for handling packet data. The method includes assembling request packets for transmission along a plurality of serial lanes. For each lane, at least a portion of the request packets are framed into a request link frame having a plurality of words. The request link frame is defined by a preset word length. Request training words are inserted into the request link frame at intervals corresponding to the preset word length. Response packets are queued, where the response packets include response training words having an associated latency based on the programmed interval of the request training words.

17 Claims, 3 Drawing Sheets

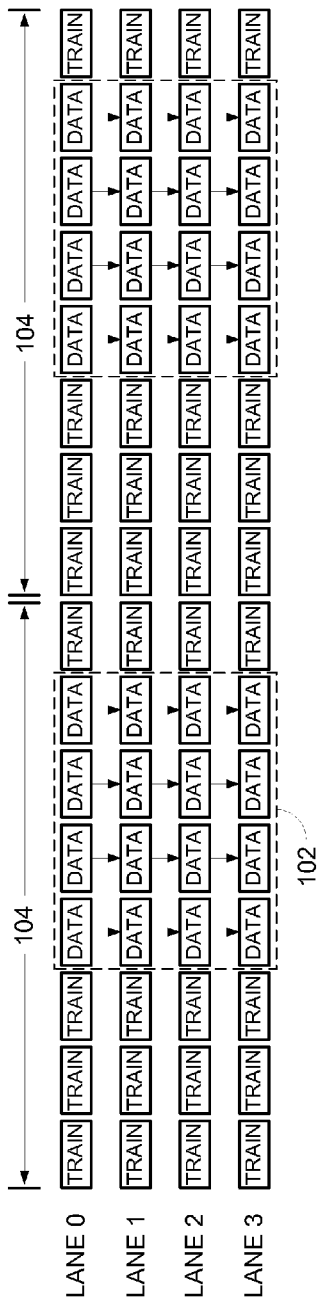
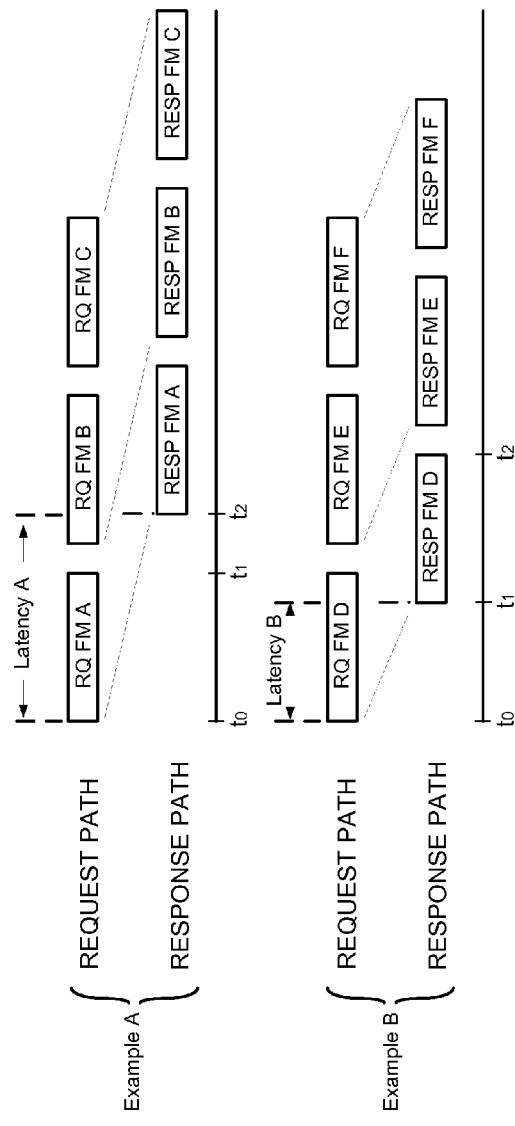

SERIAL LINK TRAINING METHOD AND APPARATUS WITH DETERMINISTIC LATENCY

TECHNICAL FIELD

This disclosure relates generally to serial link interfaces, and more particularly to methods and associated apparatus for minimizing non-deterministic latency in a serial link interface through deterministic training word operations.

BACKGROUND OF RELATED ART

Serial interfaces play an important role in high-speed chip-to-chip signaling. By transferring serialized data along a serial data path, or link, chip pin counts may be minimized while increasing data rates between the chips. While numerous serial protocols exist to enable transmission and receipt of high-speed packet data, very few adequately address latency issues that may arise during data transmission and reception.

For example, many protocols employ training words to periodically update link parameters to maintain optimal link operation. The training words may be transmitted and received at initialization, or periodically sent and received at regular intervals. In this manner, certain alignment, scrambling, and error detection functions may be carried out to minimize link downtime.

One specific protocol, known as the Interlaken serial protocol, organizes training words into per-lane "meta-frames" that also include a portion of a data packet payload, the data payload being spread across multiple meta-frames, and in-between meta-frames. Each link partner that communicates via the protocol establishes a programmed meta-frame word length that repeats during normal link operations, effectively inserting the training control words into meta-frame words for each link every meta-frame interval.

FIG. 1 illustrates a generalized organization of data and training words along multiple serial lanes LANE0-LANE3 in accordance with the Interlaken protocol. A first data payload field 102 for the packet is shown with a plurality of data words DATA that are striped along the serial lane interface beginning with Lane 0 (as shown by the arrows interconnecting each column of data words). Each lane is organized into multiple link frames 104 that each include several of the data words along with multiple training words TRAIN. The meta-frames have programmable word lengths that repeat every associated programmed interval. In the example of FIG. 1, the programmed meta-frame length is shown as eight words.

One problem with the Interlaken protocol involves non-deterministic latency associated with transmitting request link frames from one chip at a first frame length and receiving related response frames from the other chip at a different programmed link frame length. FIG. 2 illustrates the problem, which results, for one reason, because of the independence between the respective meta-frame programming on each chip. Example A shows a round-trip latency of "Latency A" that includes the latency associated with a request link frame RQ_FM_A framed according to the Interlaken meta-frame methodology, and additional latency associated with a response link frame RESP_FM_A also framed in accordance with the Interlaken protocol. Example B shows the same arrangement, but with the response words beginning with RESP_FM_D responding sooner than frame RESP_FM_A, thus exhibiting a shorter latency "Latency B" than the latency from Example A. Thus, although the latency in the second example is less than the first, queuing logic on the requesting chip often needs to account for at least the worst-case latency in order to efficiently pipeline response packets to the request chip core circuitry. This is undesirable from an efficiency and bandwidth standpoint.

Thus, the need exists for a serial data method and apparatus that minimizes non-deterministic latency for a serial link while still providing periodic training capabilities in the system.

BRIEF DESCRIPTION OF THE DRAWINGS

The present embodiments are illustrated by way of example and are not intended to be limited by the figures of the accompanying drawings, where:

FIG. 1 illustrates an example of a data packet word-striped over plural serial links and showing per-lane link frame arrangements including data payload and training words;

FIG. 2 illustrates latency variations associated with request and response packets transferred via the Interlaken serial protocol;

Like reference numerals refer to corresponding parts throughout the drawing figures.

DETAILED DESCRIPTION

Figure 3:
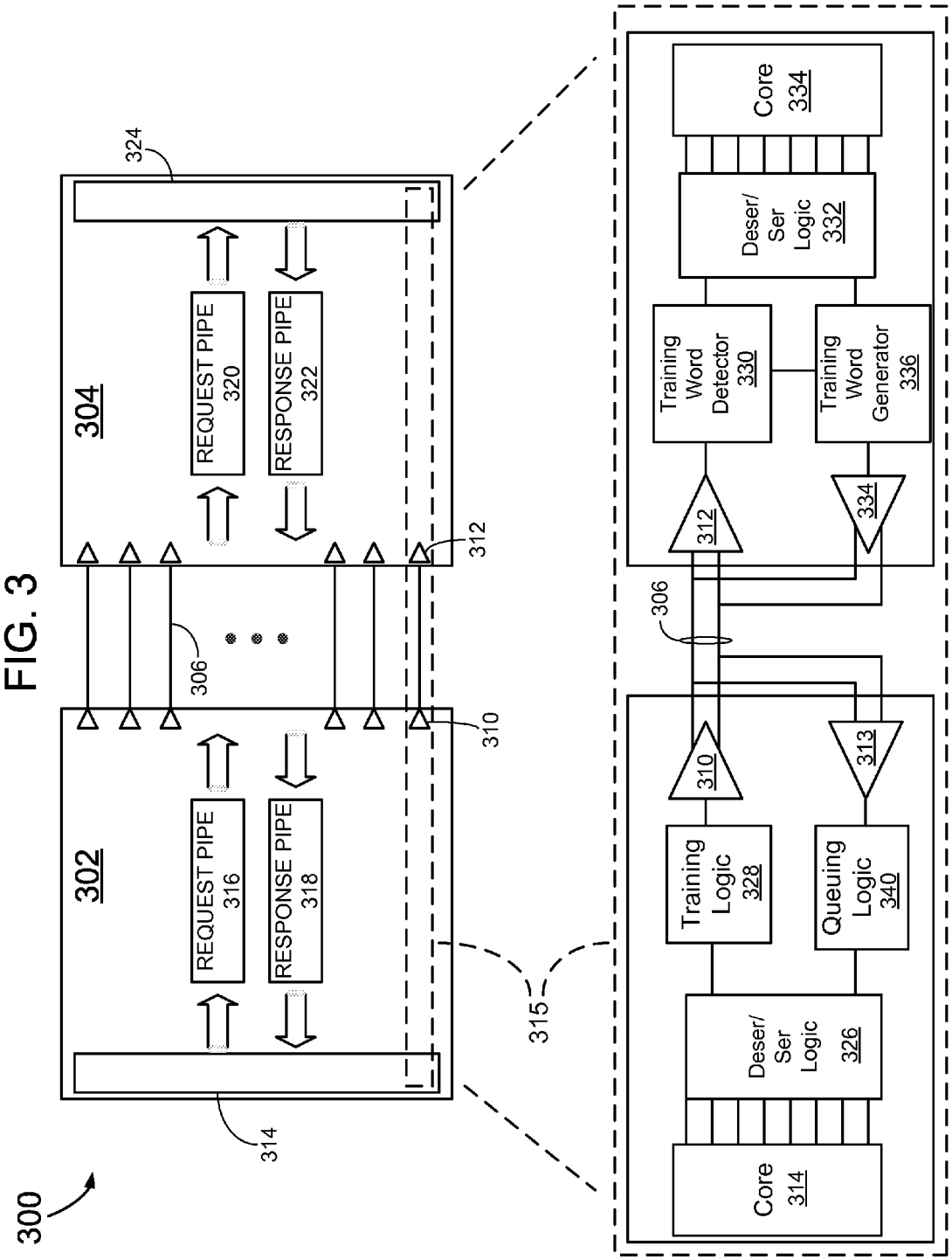
FIG. 3 illustrates a pair of integrated circuit chips interconnected by a plurality of serial links, and a detail close-up of an exemplary channel in accordance with the disclosure herein.

In the following description, numerous specific details are set forth such as examples of specific components, circuits, and processes to provide a thorough understanding of the present embodiments. In the following description, for purposes of explanation, specific nomenclature is set forth to provide a thorough understanding of the present embodiments. However, it will be apparent to one skilled in the art that these specific details may not be required to practice present embodiments. In other instances, well-known circuits and devices are shown in block diagram form to avoid obscuring the present embodiments unnecessarily. It should be noted that the steps and operation discussed herein (e.g., the loading of registers) can be performed either synchronously or asynchronously. The term "coupled" as used herein means connected directly to or connected through one or more intervening components or circuits. Any of the signals provided over various buses described herein may be time multiplexed with other signals and provided over one or more common buses. Additionally, the interconnection between circuit elements or blocks may be shown as buses or as single signal lines. Each of the buses may alternatively be a single signal line, and each of the single signal lines may alternatively be buses. Further, the prefix symbol "/" or the suffix "B" attached to signal names indicates that the signal is an active low signal. Each of the active low signals may be changed to active high signals as generally known in the art.

A method is disclosed for handling serialized packet data. The method includes assembling request packets for transmission from a first IC to a second IC along a plurality of serial lanes. For each lane, at least a portion of the request packets are framed into a request link frame having a plurality of words. The request link frame is defined by a preset word length. Request training words for transmission from the first IC are inserted into the request link frame at intervals corresponding to the preset word length. Response packets received from the second IC are queued, where the response packets include response training words having an associated latency based on the programmed interval of the request training words. By managing the transmission of training words with response packets based on request training words, the latency associated with the response training words corresponds to the known request training word latency. This correspondence enables the response data word latency to be knowable and deterministic for queuing logic disposed in the first IC, thus improving overall system performance.

In one embodiment, an integrated circuit is disclosed for communicating with a look-aside processor via a serial link interface. The integrated circuit comprises a request pipeline having an output to transmit request data words to the look-aside processor. The request data words are organized into periodically repeating request link frames of a predefined word length. A response pipeline having an input receives response data words a predetermined time after sending associated request data words. The response data words being organized, for each link, into link frames that are transmitted from the look-aside processor based on when request link frames are received at the look-aside processor.

In a further embodiment, a system is disclosed that includes a first electronic device coupled to a second electronic device via a serial link. The first electronic device has a request transmitter for transmitting request packets in accordance with a serial protocol and a receiver for receiving response packets. The second electronic device includes a receiver circuit to receive the request packets and a response transmitter for transmitting response packets to the first electronic device. The first electronic device and the second electronic device cooperate to form respective request and response paths having associated request and response path latencies such that the response path latency is based on the request path latency.

FIG. 3 shows a high-level chip-to-chip architecture 300 that employs a plurality of serial links 306 or lanes between respective first and second integrated circuit (IC) devices 302 and 304. For purposes of clarity, the IC devices are described herein as IC chips, but may also include any type of electronic device employing a serial interface. Each lane includes a differential pair of conductors for propagating differential signals or symbols. The paths may be implemented on printed circuit board substrates, such as FR4, backplanes, or via suitable cables. Each link is bounded by respective transmitter and receiver link partners 310 and 312.

Further referring to FIG. 3, the first integrated circuit (IC) 302, in one embodiment, takes the form of a network processing unit, or NPU, and includes a processor core 314, request pipe 316, response pipe 318, and serial link interface including the transmitter 310 and a receiver 313. The request pipe 316 queues request packets for transmission via the serial link interface to the second IC 304. The response pipe 318 receives response packets from the second IC and queues them for proper forwarding to the core 314.

With continued reference to FIG. 3, the second IC 304 may take the form of a look-aside processor, such as a knowledge-based processor (KBP) which includes a request pipe 320 for managing incoming request packets received from the first IC 102, and a response pipe 322 that manages response packets based on data generated from a KBP core 324 for transmission to the first IC 302. The total round-trip latency from the transmission of a request packet to the receipt of a related response packet thus depends on several variables. In one embodiment, the respective IC's 302 and 304 are operative in one of two modes to selectively take advantage of deterministic latency features described below relating to training word communications.

Referring now to the close-up detail of FIG. 3, which illustrates a high-level block diagram of one end-to-end channel 315 in the serial interface, the NPU side of the channel may include a coupling between the NPU core 314 and serializer/deserializer (serdes) logic 326 to convert parallel request data words to serial words (and vice-versa for response data words). The data word conversion from parallel to serial form in the serdes logic 326 may also involve various encodings, such as embedding of a clock signal for later recovery at the receiver, generating an error correction code (such as a cyclic redundancy code, or CRC), and encoding the data and control bits into a 64B/67B format (Interlaken-specific) to achieve a guaranteed edge transition density. The serdes logic also handles word striping functions to distribute packet words across the plural serial lanes 306. Training logic 328 generates and inserts training words based on predetermined word intervals and feeds the words to the transmit circuit 310. The transmit circuit transmits the data and training words across an associated serial link 306 to a corresponding receiver circuit 312. While the plural lanes are illustrated as unidirectional links for simplex data transmission, this is merely for purposes of clarity. Bidirectional links that provide duplex data transmission and reception functionality may also be employed as is well-known in the art.

The training words generated by the NPU-resident request-side training logic 328 may take on several forms, depending on the application. In one mode, an Interlaken serial protocol ("Interlaken") is employed for communicating data and control information, such as the training words, between the link partners 310 and 312. Interlaken's framing method involves striping data and control words across the multiple serial lanes, and organizing each lane into a "meta-frame." Each meta-frame includes a plurality of control or training words to periodically enable the system to provide adjustments relating to word alignment, lane alignment, scrambling and error detection. A meta-frame word length is programmed depending on the desired adjustment rate to each lane.

Further referring to FIG. 3, at the KBP side of the channel 315, the serial packets are received by a receiver circuit 312 and may undergo decoding by various circuits to, for example, recover embedded timing information with a clock and data recovery circuit (not shown). The received data may also be evaluated in an error detection and correction process by an ECC decoder (not shown) that generally involves calculating a checksum from a portion of the received encoded data bits, and confirming that the received data has no errors.

Following extraction of the timing information, the serial data stream is fed to a training word detector 330, which in one mode of operation identifies reception of a training word indicating the start of a link frame (such as a meta-frame). Detection may be carried out by identifying an appropriate field in one of the training words identifying it as such. Response-side deserializer logic 332, such as provided by a physical coding sublayer (PCS), converts the received packet words into parallel data words that may then be forwarded to KBP core circuitry 334.

With continued reference to FIG. 3, the request path described above is mirrored by a response path that includes respective response pipes 322 and 318 in the KBP 304 and NPU 302, and begins with response data generated by the KBP core circuitry 334 in response to previously received request packets. The serdes logic 332 serializes the data into words and stripes the words across the multiple lanes 306 of the serial interface. The assembled words may then be transmitted by a transmit circuit 334 as a response packet to the NPU 302. In one mode, a training word generator 336 communicates with the training word detector 330 to insert training words into the response packet in response to detecting training words in the request path. In a different mode, training words are inserted into the response packets consistent with programmed intervals defined in accordance with the Interlaken protocol.

Response words transferred across the response path by the second IC 304 are received by a receiver circuit 313 on the NPU 302 and passed to queuing logic 340. The queuing logic queues response packets prior to forwarding them on to the deserializer logic 326 for deserializing. Predetermined timeslots are reserved by the queuing logic 340 to properly feed the NPU 302 for optimum bandwidth. By accurately predicting the timeslots, based on the determined latency of the response packets, optimal "packing" of the timeslots may be accomplished.

Figure 4:
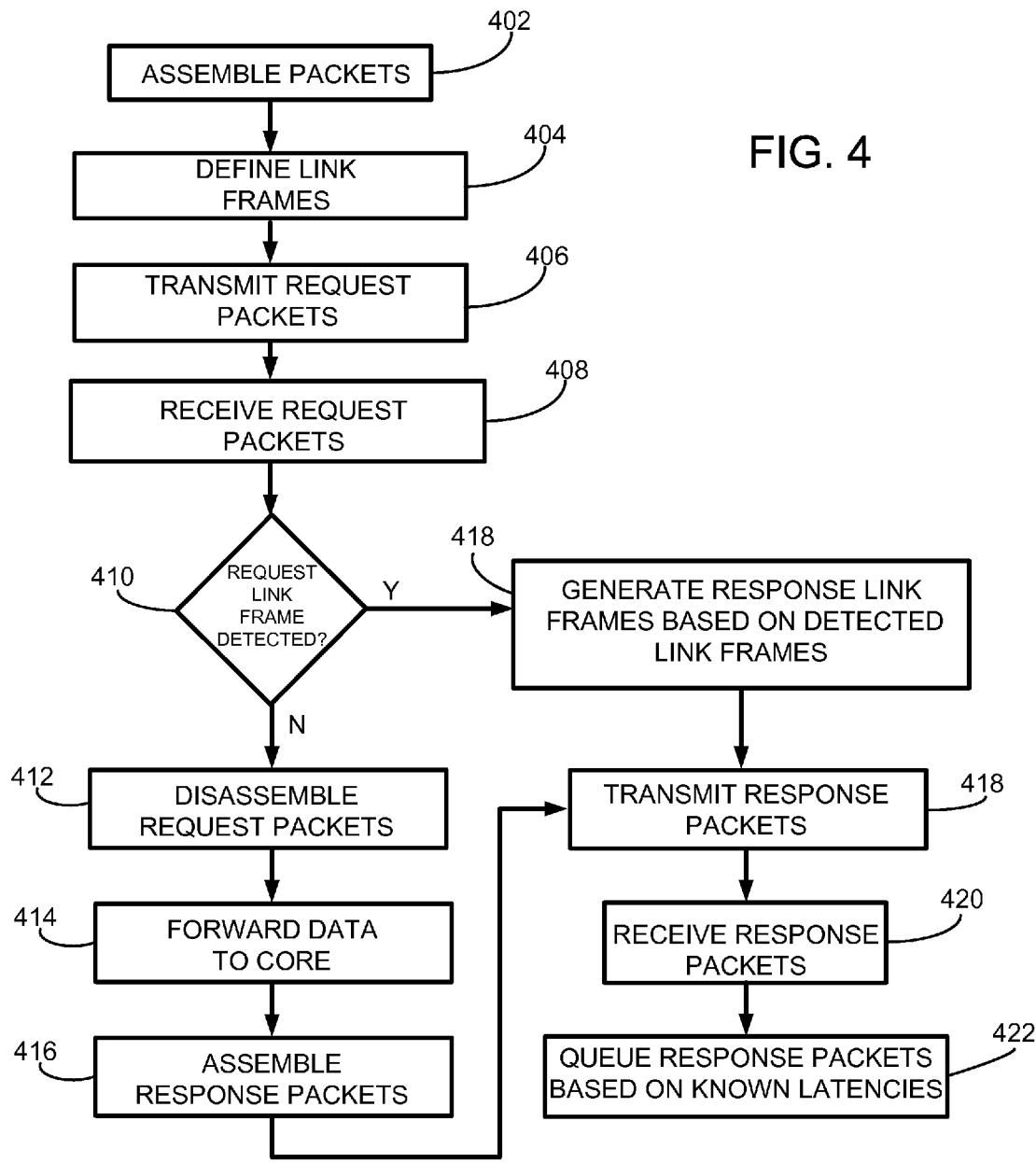
FIG. 4 illustrates a flowchart with steps defining a method of transferring serial streams of data and control words to minimize latency variations.

FIG. 4 illustrates a method consistent with a mode of operation that utilizes the training word detector 330 and generator 336 on the KBP 304 to establish consistent and predictable response packet latencies. As explained above, having a deterministic latency associated with response link frames coming from the KBP enables finer timing accuracy associated with the queuing logic 340, thus maximizing pipeline efficiency and bandwidth.

With reference to FIG. 4, the method begins by assembling request data into request packets on the NPU 302, at step 402. Per-lane link frames are then defined with appropriately programmed word lengths, and the packets framed accordingly, at step 404. The framed request packets are then transmitted to the KBP 304, with the link frames being transmitted at regular intervals corresponding to the programmed link frame length values, at step 406. With the request link frames having a known programmable word length, the latency associated with the request link frames is a known entity, and thus deterministic.

Further referring to FIG. 4, the request packets are received at step 408, and evaluated at step 410 to determine when a request link frame is received. If a link frame is not detected, the packets are deserialized and disassembled, at step 412, and forwarded to the KBP core, at step 414. Response packets generated by the core are then assembled and serialized for transmission to the NPU 302, at step 416.

Response packet transmissions from the KBP 304 to the NPU 302 are handled similar to the request transmissions, except that response link frames are not generated based on a pre-programmed value, but rather based on the receipt of request link frames. Thus, when the start of a request link frame is detected by the training word detector 330, a signal is immediately sent to the training word generator 336 to generate training words for insertion into the assembled response packets, at step 418, thus generating response link frames having intervals based on the request link frames. Since all response link frames are based on the request link frame interval, the latency associated with the response packets due to training word insertion is thus deterministic. The response link frames are then transmitted as part of their associated packets, at step 418, received at the NPU 302, at step 420.

Upon receipt of the response packets at the NPU 302, the pipeline timeslots assigned by the queuing logic 340 allow for optimum pipeline forwarding of the response data to the NPU core 314. This is possible due to the round-trip deterministic latency associated with the request and response link frames. Of course, in circumstances where the deterministic latency features are not desired, standard meta-frame generation from the response chip 304 may be enabled merely by setting the appropriate mode register value. In such circumstances, the training word detector is disabled, allowing for pre-programmed meta-frame intervals.

Those skilled in the art will appreciate the many benefits and advantages afforded by the embodiments described herein. For example, by detecting request link frames, and generating response link frames based on the request link frame detection interval, the round-trip latency associated with link frames may be more deterministic, enabling queuing logic in the NPU to more accurately manage processor timeslots for data word reception and processing.

In the foregoing specification, the present embodiments have been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense.

What is claimed is:

1. A method, comprising:
    assembling request packets for transmission along a plurality of serial lanes; and for each lane:
    framing at least a portion of the request packets into a request link frame having a plurality of words, the request link frame being defined by a preset word length;
    inserting request training words into the request link frame at intervals corresponding to the preset word length;
    queuing for response packets, the response packets including response training words having an associated deterministic latency based on a programmed interval of the request training words; and
    assigning processing timeslots for the response packets based on the programmed interval of the request training words.

2. The method of claim 1, wherein the framing comprises organizing the plurality of words on a per-lane basis.

3. The method of claim 2 wherein the framing further comprises inserting at least one training word into the request link frame.

4. The method of claim 3, wherein the at least one training word comprises one from the group comprising a scrambler word, a diagnostic word, or an alignment word.

5. An integrated circuit for communicating with a look-aside processor via a serial link interface, the integrated circuit comprising:
    a request pipeline having an output to transmit request data words to the look-aside processor, the request data words being organized into periodically repeating request link frames of a predefined word length; and
    a response pipeline having an input to receive response data words at a predetermined time after sending associated request data words, the response data words being organized, for each link, into link frames that are transmitted from the look-aside processor based on when the request link frames are received at the look-aside processor;
    wherein the response pipeline includes queuing logic to assign processing timeslots based on a deterministic latency of response packets.

6. The integrated circuit of claim 5, wherein
    the integrated circuit comprises a network processing unit (NPU).

7. The integrated circuit of claim 5, wherein
    the look-aside processor comprises a knowledge based processor (KBP).

8. An integrated circuit for communicating with a network processor via a serial link interface, the integrated circuit comprising;
- a request pipeline configured to receive request data words from the network processor, wherein the request data words are organized into periodically repeating request link frames of a predefined word length;
- a link frame detector configured to identify a start of a request link frame comprising a plurality of words of a predefined word length;
- a training word generator configured to insert response training words into a response link frame; and
- a response pipeline output configured to send the response link frame to the network processor in response to detecting the start of the request link frame, wherein the response link frame has a response training word latency corresponding to a request training word latency.

9. The integrated circuit of claim 8, wherein the integrated circuit comprises a knowledge based processor (KBP).

10. The integrated circuit of claim 8, wherein the integrated circuit includes a mode register to store a value indicating operation in one of a plurality of modes.

11. The integrated circuit of claim 10, wherein in a first mode, the request link frame comprises a meta-frame.

12. The integrated circuit of claim 11, wherein in a second mode, the response pipeline output ignores the detected start of the request link frame, and generates response link frames based on a preprogrammed word interval.

13. A system, comprising:
- a first electronic device having a request transmitter for transmitting periodic request packets in accordance with a serial protocol and a receiver for receiving response packets;
- a serial link having one end coupled to the first electronic device to route the request packets; and
- a second electronic device having a receiver circuit coupled to a second end of the serial link to receive the request packets and a response transmitter for transmitting the response packets to the first electronic device;
- wherein the first electronic device and the second electronic device cooperate to form respective request and response paths having associated request and response path latencies;
- wherein the response path latency is based on the request path latency; and
- wherein the first electronic device includes queuing logic to assign processing timeslots based on a deterministic latency.

14. The system of claim 13, wherein the first electronic device comprises a network processing unit (NPU) and the second electronic device comprises a knowledge based processor (KBP).

15. The system of claim 13, wherein the serial protocol comprises Interlaken protocol.

16. The system of claim 13, wherein the request packets are organized on a per-link basis into request link frames having a predefined word length and at least one request training word, and wherein the response packets are organized on a per-link basis into response link frames having a word length based on the predefined word length and including at least one response training word.

17. The system of claim 16, wherein the second electronic device includes:
- a request training word detector to identify the start of a request link frame; and
- a response training word generator responsive to an identified request link frame to generate a response link frame.

* * * * *